United States Patent [19]

Emschermann et al.

[11] 4,044,238

[45] Aug. 23, 1977

[54] METHOD AND ARRANGEMENT FOR MEASURING AND EVALUATING TEMPERATURES IN TEMPERATURE PROCESSED GOODS

[75] Inventors: Hans Heinrich Emschermann; Bruno Fuhrmann; Dieter Huhnke, all of Braunschweig, Germany

[73] Assignee: Felten & Guilleaume Carlswerk AG, Cologne, Germany

[21] Appl. No.: 636,710

[22] Filed: Dec. 1, 1975

[30] Foreign Application Priority Data

Nov. 30, 1974 Germany .............................. 2456663

[51] Int. Cl.² ............................................ G06F 15/46
[52] U.S. Cl. .................................. 235/151.1; 99/486; 235/151.3; 426/521
[58] Field of Search .......................... 235/151.1, 151.3; 73/343 R, 343.5; 195/125; 99/467, 468, 483, 486; 426/407, 520, 521

[56] References Cited

U.S. PATENT DOCUMENTS

| | | |
|---|---|---|
| 3,814,913 | 6/1974 | Ironside et al. .................... 235/151.1 |
| 3,819,915 | 6/1974 | Smith ............................. 235/151.1 X |
| 3,843,872 | 10/1974 | Shimomura .................... 235/151.3 X |

Primary Examiner—Jerry Smith
Attorney, Agent, or Firm—Michael J. Striker

[57] ABSTRACT

Temperature variable resistor or thermocouples measure the temperature of the goods. The so-measured values are converted to digital temperature signals under control of a clock pulse generator at predetermined time intervals. The digital temperature signals are stored and the so-stored signals utilized to address storage locations in a permanent storage, each of the storage locations storing a weighted digital temperature signal. The weighted digital temperature signals are converted to pulse sequences and the so-formed pulse sequences summed in a summing circuit. The sum signal furnished by the summing circuit is indicative of the effectiveness of the temperature processing. Digital or analog display means may be utilized to display the sum signal and/or the individual digital temperature signals.

10 Claims, 2 Drawing Figures

4,044,238

METHOD AND ARRANGEMENT FOR MEASURING AND EVALUATING TEMPERATURES IN TEMPERATURE PROCESSED GOODS

BACKGROUND OF THE INVENTION

The present invention relates to a method and system for measuring and evaluating the temperatures in goods undergoing temperature processing such as heating or cooling processes. In particular, the present invention relates to such systems and methods as utilized in measurement and evaluation of the temperatures created in preserves during the sterilization process.

It is for example conventional in the food preservation technology to denote a so-called "sterilization value" which is indicative of the sterilization effect of a heating apparatus. Sterilization value $F$ must be reached in order to keep the number of microorganisms within the food to a predetermined number. The desired sterilization value $F$ varies as a function of temperature, the length of time a particular temperature is maintained, and the pH value of the goods. The following equation is applied:

$$F = \tau \cdot 10^{\frac{1.8\ T/^\circ C - 218}{z}} \tag{1}$$

$T$ is the temperature at the critical location in the goods (also denoted as the core temperature) which is assumed to be maintained constant for a time interval $\tau$. $z$ is a number assigned to the pH value of the goods.

In practice, because of the cooling and heating portions of the cycle, the core temperature of the goods may not be considered constant. In this case the actual sterilization value $L$ is taken as the sum of the partial sterilization values corresponding to sequential time intervals each having a time $\Delta t$. The total sterilization value is then calculated by the equation $$L = \Sigma\ 10^{\frac{1.8\ T/^\circ C - 218}{z}} \Delta t \tag{2}$$

The preserved food will be free of the excess microorganisms if, through a suitable heating process, it has been accomplished that $L = F$, that is it is necessary in order to control the sterilization that the actual sterilization value $L$ is monitored continuously, that is the value of the sum in equation 2 is determined. In order to generate the sum it is of course necessary that the variation with respect to time of the temperature $T$ be known. The calculation of this sum can be considerbly simplified by making some basic assumptions as to the temperature variation. Such simplifying assumptions for example may be: $T$ is constant; $T$ is a linear function or a logarithmic function of time. In the more general case in which $T$ is not a simple function of time, it is usual to use the method of graphic analysis originated by Bigelow. For this, it is first necessary that an experimentally furnished curve of core temperature versus time be furnished. The temperature $T$ during predetermined sequential time intervals is then derived from this curve and partial sterilization values $\Delta L$ are computed. The sterilization value then results from the summing of the partial sterilization values, that is $$\Delta L = 10^{\frac{1.8\ T/^\circ C - 218}{z}} \Delta t.$$

Alternatively, the partial sterilization values $\Delta L$ may be entered as ordinates plotted against suitable time values entered on the abscissa, the area under the curve then constituting the sterilization value $L$.

A number of errors are introduced by the various simplifying assumptions regarding the temperature variations as a function of time. All of the above-mentioned processes are time consuming and difficult and subject to many errors including calculating errors.

SUMMARY OF THE INVENTION

It is an object of the present invention to furnish a method and system which is not subject to the above-mentioned difficulties.

It is a particular object of the present invention to furnish the sterilization value directly and exactly by means of simple equipment.

The method in accordance with the present invention includes the steps of measuring the characteristic temperature of the process at regular time intervals and furnishing digital temperature signals indicative of the so-measured temperature. The digital temperature signals are applied to a code converter which furnishes weighted digital temperature signals in response to each of the so-applied digital temperature signals. The weighted digital temperature signals are then applied to summing circuit means. The sum signal furnished by the summing circuit means (which corresponds to the sum of the signals applied thereto) is indicative of the sterilization value $L$. It is noted that no temperature curves must be generated and further, that no calculation by an operator is required. The sterilization value can be derived very rapidly and the reliability of the computed results is of course much higher than it would be by operator computation.

Measurement means which do the measuring may of course be in an environment of very high temperature. It may thus be difficult to transmit the temperature signals to an outside environment. Under the circumstances it may be desirable that the digital temperature signals are first stored. They are then applied to the code converter at a later time; for example, after the measuring means have completed their operation, the stored measurement signals are applied to a code converter which is located in a separate housing. The method in accordance with the present invention is then completed when the signals are so applied to the code converter.

In an alternate preferred embodiment of the present invention the weighted temperature signals furnished by the code converter are stored in a storage and then applied to the summing circuit means at a later time this case, the storage storing the digital temperature signals as well as the code converter. may be mounted in a thermally insulated housing at the measuring location. After the termination of the measuring process, the code converter is then brought into an environment having the normal operating temperature and the values stored in the buffer storage associated with the code converter are applied to the summing circuit.

In a further preferred embodiment, the digital temperature signals stored in the storage may be furnished to a display and/or to a digital-analog converter with an associated recorder. This of course makes it possible that the actual variation of temperature with respect to time is also available if this is of interest.

The apparatus in accordance with the present invention comprises temperature measurement means which furnish digital temperature signals. Further they comprise code converter means connected to the measurement means which furnishes weighted digital temperature signals in response to each of the digital temperature signals applied thereto. The weighted digital temperature signals are then applied to summing circuit means which furnish a sum signal indicative of the sterilization value.

In a preferred embodiment of the present invention the code converter means may comprise a computer and, in particular, a digital differential analyzer. For any given z value, the computer computes equation 2, that is, it computes the value of $10^{(1.8T/°C - 218/z)}$, multiplies this by the time $\Delta t$ and adds the products over the time period $t_2 - t_1$. It is seen that the weighting of the temperature signals is accomplished by the generation of exponential values of 10. Such computers are commercially available and are well known in the data processing art. Their functioning must thus not be explained in greater detail. It should only be mentioned here that a constant time interval $\Delta t$ is generally chosen, that is the differential computer is clocked at a clock frequency of $1/\Delta t$, so that the factor $\Delta t$ may be moved in front of the sum sign. It is thus necessary only that the computer computes the powers of 10 under control of the clock pulse. Later, after the complete sum has been computed, the multiplication by the factor $\Delta t$ takes place.

In a further preferred embodiment of the present invention the code converter is a digital permanent storage. This may lead to lesser expense and a construction which is simpler overall. The permanent storages are of course well known in the data processing art. The storage have a plurality of storage locations, each storing a weighted temperature value. Specifically, in a sterilization process, values of $10^{(1.8T/°C - 218/z)}$ are computed and are stored digitally in the permanent storage. A particular z value is of course associated therewith. Digital temperature signals which were derived by measurement then are used to address the storage at a fixed clock frequency $1/\Delta t$. The weighted temperature signals derived from the permanent storage in response to the addressing by the digital temperature signals are then summed in a counter. Again it should be noted that the computing of the powers of 10 is considered as a weighting of the actual temperature values which have been measured.

A particularly unambiguous indication of a measured value is of course furnished by a digital indication. Therefore in a preferred embodiment of the present invention, the display means are a digital display. It may also be desirable for the processor of the food that, after the conclusion of the sterilization process, the time variation of temperature within the goods also be readily available. It may then for example be possible to determine how to change the temperature cycle if, for example, the computed sterilization value is higher than the desired sterilization value. The temperature cycle can then be changed in order that the desired sterilization value is not exceeded in the future. In order to give such an indication of the time variation of temperature, the digital temperature signals are applied to a digital-analog converter and a recorder is then connected to the digital-analog converter.

The use of electrical conductors of course makes a measuring process more difficult and has the further disadvantage that the use of such current carrying conductors may in itself result in complications in the measuring process and the conductors themselves may be subject to damage. Thus, it may be desirable, as is the case in a preferred embodiment of the present invention, to enclose the measurement means (which include the analog-digital converter and the storage means associated therewith) as well as the various components necessary in order to supply current thereto in a separate thermally insulated and/or moisture-proof compartment. This causes the equipment to be compartmentalized, that is the portion of the equipment which is in contact with the goods whose temperature is to be measured is in this compartment while the remainder of the circuitry is in another compartment or housing in another location. Also, the measuring process is then divided into two separate time intervals. During the actual measuring time, the temperature sensors are connected to the first group of components, that is the components housed in the first compartment and the sensed temperatures are converted into binary coded stored signals. Suitable temperature sensors are temperature variable resistors or thermocouples. After the actual temperature measuring cycle is over, the unit including the storage means is electrically connected to the second compartment and the values stored in the storage means are read out. Thus the temperature measurement means, which is, in a preferred embodiment of the present invention, embodied in thermoelectric elements such as temperature variable resistors or thermocouples, is operative during a relatively long time period in order to generate the necessary temperature signals. The digitally stored measured values are then weighted and summed during a time interval which is substantially shorter than the actual measuring interval.

In a further preferred embodiment of the present invention, the individual temperature values derived at the different measuring times are also indicated, that is the values of the digital temperature signals stored in the storage means are applied from the storage means to a digital display and/or to a digital-analog converter with a recorder connected to the output of said converter. The digital display of course directly indicates the measured temperature values, while the digital-analog converter with the associated recorder immediately generates a curve of temperature versus time.

In a sterilization process the value z depends on the pH value of the goods. Thus the z value for fruit is 7.5, while, for vegetables, it is usually 3. Thus it is to be noted that the changes in the z value for different goods can be considerable. It may thus frequently be necessary that different z values are utilized when different types of goods are being preserved. Thus, in a preferred embodiment of the present invention, the code converter (permanent storage) have adjustable different measuring regions which are achieved either by a switch or by the use of plug-in cards. Thus a sterilization process may be carried out with a selectable value of z. If a digital differential analyzer is utilized, then it must be possible to change the value of z in its program. If a digital permanent storage is utilized, then the values to be stored in the different storage locations must first be calculated for each of a plurality of z values. The values on any one of the plug-in cards are then each values computed on the basis of the same z, the different cards carrying values for different values of z. Thus for any given sterilization process it is only necessary to select the correct card.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
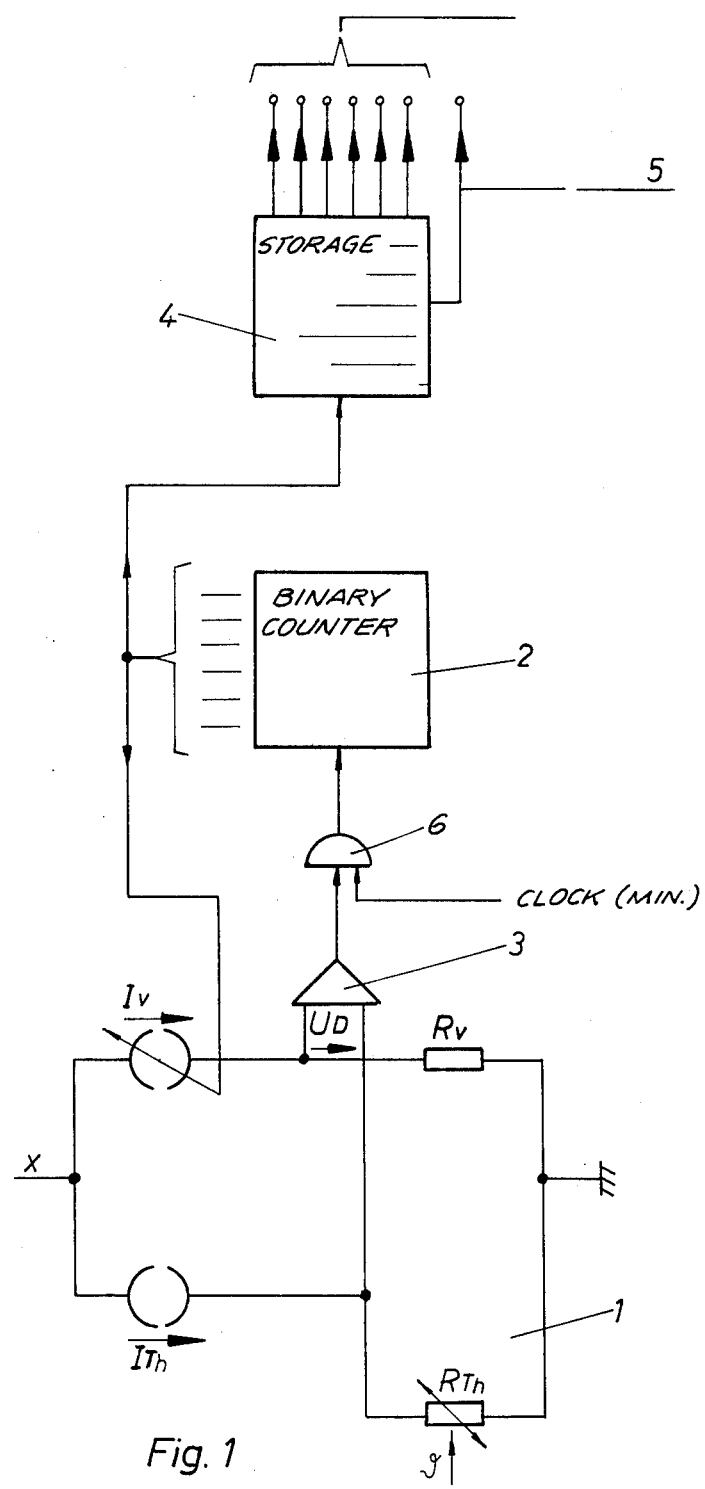
FIG. 1 is a schematic diagram indicating a preferred embodiment of the measurement means of the present invention.

A preferred embodiment of the present invention will now be described with reference to the drawing.

Figure 2:
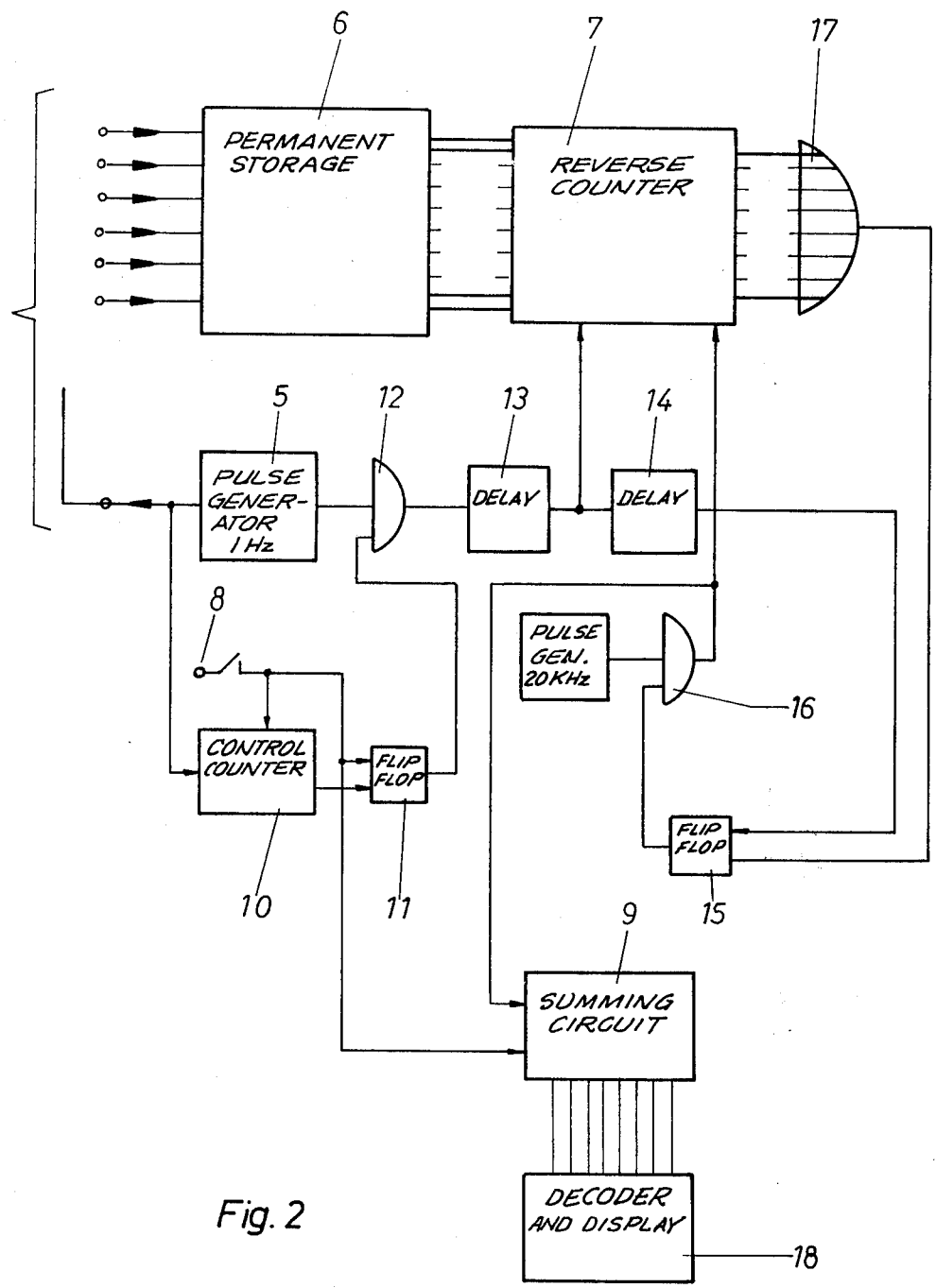
FIG. 2 is a schematic diagram indicating the code converter and summing means of the present invention and the display.

As shown in FIG. 1, a temperature sensor 1, here a platinum resistor $R_{Th}$ measures the temperature of the goods, the so-measured value being converted to a digital electrical signal. Specifically, the resistor forms part of a bridge circuit whose output signal is applied to an amplifier 3. The signal from the bridge circuit is equal to zero when the bridge is balanced. The rebalancing of the bridge under different temperature conditions is achieved by a variable current source, $I_V$ whose value is initially set for a value $I_{VO}$. Additional current sources to the source $I_{VO}$ are applied to the bridge circuit under control of a binary counter 2 which, for each count pulse, passing gate 6, adds an additional binary-weighted current source. Further, it counts the number of steps for each of which an additional current source is supplied. Since there will be no further input to the binary counter 2 when the bridge is balanced, the count on counter 2 at bridge balance corresponds to the change in current $\Delta I_V$, that is the temperature difference between a reference temperature such as for example 70° C for which the bridge circuit was originally balanced and the final temperature sensed by sensor 1. After each of the digital temperature signals has been generated in binary counter 2, the value stored in this counter is supplied to the storage means 4. These may for example be embodied in shift registers having, in a preferred embodiment of the present invention, 64 storage locations of 6 bits each. In this embodiment, 64 digital temperature signals, that is 64 measured values in a temperature region between 70° C and 133° C in steps of 1° C may be stored. The maximum measuring time is given by the number of storage locations and by the time interval between two sequential measuring values, that is the time interval as defined by the clock pulses clock (min.) of FIG. 1. For a clock pulse having a repetition rate of approximately one pulse per minute, the measuring time is approximately an hour. For other types of storages, the number of storage locations can, without any difficulty, be increased to 1000 or more. The energy supplied by means of a low voltage battery such as, for example, a 9 volt battery. For the read-out from the storage, a much higher frequency, such as the 1Hz frequency of pulse generator 5 of FIG. 2 is utilized. Thus, for a measuring process which occupied 1 hour, the values may be read out in 1 minute.

Referring now to FIG. 2, pulse generator 5 causes the values stored in storage 4 to be read out and applied to the permanent storage 6 for addressing corresponding storage locations therein at a frequency of 1Hz. The permanent storage 6 includes storage locations each of which, upon being addressed, will furnish the $\Delta L$ value corresponding to the applied digital temperature signal. The output of the permanent storage 6 is a 12 bit output which is applied to the set inputs of a binary reverse counter 7. Binary reverse counter 7 also has a set control input. The counter is set to a number corresponding to the number at the set inputs when a pulse is applied to the set control input.

The computation of the L value for the whole measuring cycle of 64 measured values by summing of the individual $\Delta L$ values then takes place as follows: First, a start key 8 is pressed by the operator. The signal applied by the activation of this start key causes the summing circuit means, here a counter 9 to be reset to zero. Further, a control counter 10 is also reset to zero and a flip-flop 11 is switched to the set state. The setting of flip-flop 11 causes a gate 12 to become conductive. Pulses from pulse generator 5 are supplied through gate 12 to a delay circuit 13 and then to the set control input of the binary reverse counter 7. The delay is introduced into the circuits in order to compensate for the delay time generated by the addressing and the read out from permanent storage 6. Thus, at the time the set control pulse is applied to counter 7, the desired input will be at the set inputs. Upon receipt of the control pulse at the set control input, the $\Delta L$ value is entered into binary counter 7. After a further delay in delay circuit 14, the clock pulse generated by pulse generator 5 is also applied to the set input of a flip-flop 15. Setting of flip-flop 15 causes a gate 16 to become conductive. After gate 16 becomes conductive timing pulses from a 20kHz pulse generator, herein referred to as a timing pulse generator, are applied to the reverse counting input of counter 7. The counter now counts in the reverse direction from the $\Delta L$ value. When the counter has reached zero, the negative going edge of gate 17, which is an OR-gate, causes flip-flop 15 to reset, closing gate 16 and preventing the further application of pulses to the counting input of counter 7. While gate 16 was open, the pulses from the timing pulse generator were also applied to the counting input of the summing circuit means, namely counter 9. The counter 9 has thus counted the number of pulses required for counter 7 to count from the $\Delta L$ value to zero. All 64 digital temperature signals, or more specifically, the weighted digital temperature signals furnished by the permanent storage 6 are processed in this manner. The number of weighted digital temperature signals processed is of course equal to the number of pulses from clock pulse generator 5. These are counted by control counter 10 which furnishes an output signal after 64 such pulses have been counted. After these pulses have been counted, a flip-flop 11 is reset, causing gate 12 to block and preventing any further clock pulses from reaching the set control input of binary counter 7. At this point, the count on counter 9 corresponds to the sum of all the $\Delta L$ values, that is to the actual value of L. This value is then applied to an indicator or, if necessary through a decoder, to a display. It is thus seen that the present invention furnishes a particularly simple manner of computing the sterilization value L. The invention is of course not to be limited to the actual elements shown since any type of suitable measurement means, code converter means and summing circuit means can be used and are to be considered encompassed by the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for determining the effect of a heating and/or cooling process upon the goods being processed, the arrangement comprising, in combination, means for measuring the temperature of the goods at regular time intervals; means for storing the successively measured temperature values during the course of the measurements; means operative after completion of the process for deriving from each stored temperature value a process effectiveness value indicative of the effect of the process upon the processed goods during the respective corresponding time interval; and means for summing the process effectiveness values and generating a sum signal indicative of the effectiveness of the entire process, wherein the means for summing the process effectiveness values comprises a backward counter, means for applying successive ones of the process effectiveness values to the backward counter, and means for causing the backward counter after receipt of each successive effectiveness value to count backward to zero.

2. The arrangement defined in claim 1, further including means for indicating the successive temperature values in order to provide information concerning the variation of the temperature of the processed goods during the course of the process.

3. The arrangement defined in claim 1, further including means for recording the successive temperature values in order to provide information concerning the variation of the temperature of the processed goods during the course of the process.

4. The arrangement defined in claim 1, wherein the means for deriving the process effectiveness values comprises an automatic incremental calculator.

5. The arrangement defined in claim 1, wherein the means for deriving the process effectiveness values comprises a permanent storage for indefinitely storing the process effectiveness values.

6. The arrangement defined in claim 1, further including means for indicating the values of a plurality of successive sum signals corresponding to multiple performance of the process.

7. The arrangement defined in claim 1, further including means for recording the values of a plurality of successive sum signals corresponding to multiple performance of the process.

8. The arrangement defined in claim 1, the means for measuring the temperature of the goods at regular time intervals comprising means for generating analog temperature-indicating signals and means for converting the analog signals to digital signals, the means for measuring the temperature and also the means for storing the successively measured temperature values being disconnectable from the means for deriving the process effectiveness values and the summing means and being located in a discrete protective housing, so that the means protected in the housing can be utilized in proximity to the location where the process is being formed and thereafter be connected at a different location to the means for deriving the process effectiveness values and the summing means.

9. The arrangement defined in claim 1, the means for deriving the process effectiveness values being operative in a plurality of different selectable modes for differently computing the process effectiveness values in correspondence to differences in the performance of the process and in the goods being processed.

10. An arrangement for determining the effect of heating or cooling upon foodstuffs to be preserved, the arrangement comprising, in combination, means for measuring the temperature $T$ of the goods to be preserved at regular time intervals during the course of the heating or cooling; means for storing the successively measured temperature values $T$ during the course of the heating or cooling; means operative after completion of the heating for deriving from the individual stored temperature values $T$ corresponding sterilization effectiveness values and summing the sterilization effectiveness values to obtain an overall sterilization effectiveness value corresponding to the expression $$\Sigma_{10}(1/z)(1.8T-218)(\Delta t)$$

wherein $z$ is the pH of the goods being heated or cooled and $\Delta t$ is the duration of each of said time intervals, wherein the means for summing the process effectiveness values comprises a backward counter, means for applying successive ones of the process effectiveness values to the backward counter, and means for causing the backward counter after receipt of each successive process effectiveness value to count backward to zero.

* * * * *